(12) United States Patent
Guthrie et al.

(10) Patent No.: US 9,137,767 B1
(45) Date of Patent: Sep. 15, 2015

(54) GENERATING FREQUENCY REFERENCE SIGNALS

(71) Applicant: Sprint Communications Company, L.P., Overland Park, KS (US)

(72) Inventors: Steven Kenneth Guthrie, Kansas City, MO (US); Timothy Hugh Pearson, Overland Park, KS (US); John Austin Holmes, Olathe, KS (US); David Richard Polson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 184 days.

(21) Appl. No.: 14/018,948

(22) Filed: Sep. 5, 2013

(51) Int. Cl.
  *H04W 4/00* (2009.01)
  *H04W 56/00* (2009.01)
  *H04W 40/02* (2009.01)

(52) U.S. Cl.
  CPC .......... *H04W 56/0015* (2013.01); *H04W 40/02* (2013.01)

(58) Field of Classification Search
  None
  See application file for complete search history.

(56) References Cited

U.S. PATENT DOCUMENTS

| | | | |
|---|---|---|---|
| 2003/0224801 A1* | 12/2003 | Lovberg et al. | 455/454 |
| 2009/0196266 A1* | 8/2009 | Wu et al. | 370/338 |
| 2010/0056177 A1* | 3/2010 | Kojima | 455/456.1 |
| 2011/0188480 A1* | 8/2011 | Takagi | 370/335 |
| 2011/0275385 A1* | 11/2011 | Escolar-Piedras et al. | 455/456.1 |
| 2012/0094652 A1* | 4/2012 | Kilgour | 455/422.1 |
| 2012/0270594 A1* | 10/2012 | Parkvall et al. | 455/524 |
| 2013/0010658 A1* | 1/2013 | Zhu | 370/280 |
| 2013/0122917 A1* | 5/2013 | Yavuz et al. | 455/450 |
| 2013/0155945 A1* | 6/2013 | Chen | 370/328 |
| 2014/0106686 A1* | 4/2014 | Higgins et al. | 455/78 |
| 2014/0242989 A1* | 8/2014 | Cai et al. | 455/436 |

\* cited by examiner

*Primary Examiner* — Otis L Thompson, Jr.

(57) ABSTRACT

The invention is directed to methods and systems for generating frequency reference signals from a radio signal received from a large-coverage access component, such as a base station. The radio signal is received and processed by an oscillator to filter out abnormalities. Consequently, a frequency reference signal is generated that is encapsulated into packets and delivered to one or more small-coverage access components using the Precision Timing Protocol or some other protocol that is useable by the small-coverage access components. The small-coverage access components comprise one or more of a femtocell or a picocell.

20 Claims, 3 Drawing Sheets

GENERATING FREQUENCY REFERENCE SIGNALS

SUMMARY

A high-level overview of various aspects of the invention is provided here for that reason, to provide an overview of the disclosure and to introduce a selection of concepts further described below in the detailed description. This summary is not intended to identify key features or essential features of the claimed subject matter, nor is it intended to be used as an aid in isolation to determine the scope of the claimed subject matter.

In brief and at a high level, this disclosure describes, among other things, methods and systems for generating a frequency reference signal for synchronization of one or more small cells from a radio signal received from a large-coverage access component, such as a macro cell (e.g., base station, eNodeB). Instead of utilizing the GPS for synchronization, using embodiments of the present invention, dependence on GPS by the small cells is unnecessary, as a neighboring macro cell transmits a GPS traceable radio signal that is received by a timing gateway located near the small cells. The timing gateway includes, in one embodiment, a receiving component, a signal processor, an oscillator, and a master component. The master component, in one embodiment, creates Precision Timing Protocol (PTP) frames that are delivered to the small cells by way of a physical interface, such as an Ethernet physical interface. In other embodiments, the output from the oscillator may be used to derive other traditional clock reference signals, including, for example, 10 MHz, 1 pps squarewave, DS1, E1, etc.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
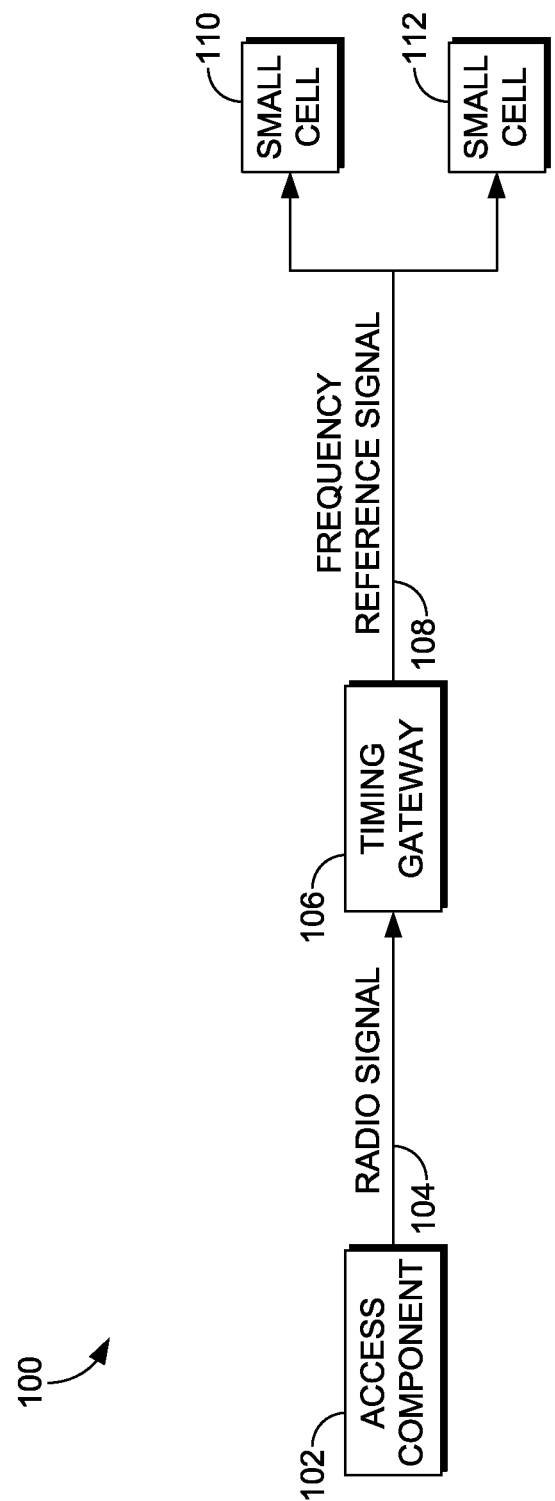
FIG. 1 depicts an exemplary illustration of a timing gateway implemented in accordance with an embodiment of the present invention.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

BTS Base Transceiver Station
DSI Digital Signal 1
FDD Frequency Division Duplex
GPS Global Positioning System
IEEE Institute of Electrical and Electronics Engineers
IPv4 Internet Protocol version 4
IPv6 Internet Protocol version 6
LTE Long Term Evolution
PPS Pulse Per Second
PTP Precision Time Protocol
RF Radio Frequency
RNC Radio Network Controller
TDD Time Division Duplex
UDP User Datagram Protocol Further, various technical terms are used throughout this description. A definition of such terms can be found in, for example, Newton's Telecom Dictionary by H. Newton, 27th Edition (2013). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As mentioned, embodiments of the present invention are directed toward generating frequency reference signals that are used to provide frequency synchronization to small cells, such as picocells and femtocells. While GPS receivers, TDM circuits, and SyncE typically are used to satisfy synchronization requirements, utilizing embodiments of the present invention, a radio signal from a neighboring large-coverage access component (e.g., macro cell, base station, eNodeB) is sent to a timing gateway for processing the radio signal to generate a frequency reference signal. The large-coverage access component is close enough in proximity to the timing gateway such that the timing gateway, by way of a receiving component having an antenna, is able to receive the signal from the large-coverage access component. In an embodiment, the large-coverage access component is capable of outputting an LTE-FDD radio signal that is traceable to the GPS reference. The timing gateway generates a frequency reference signal that is encapsulated into packets for transmission to one or more small-coverage access components, or small cells (e.g., femtocell, picocell). In an embodiment, the timing gateway includes a receiving component, a signal processor, an oscillator, and a master component. The timing gateway, in an embodiment, is located near the small-coverage access components such that the packets can be delivered to the small-coverage access components by way of a physical interface, such as by an Ethernet connection.

Typical applications for small-coverage access components include filling in gaps in coverage for large-coverage access components and providing coverage inside of buildings or other structures. Typically, a building having one or more small-coverage access components will be in the vicinity of one or more large-coverage access components, such that an optimally placed antenna could receive a signal from a neighboring base station, for example. The higher signal strength of the large-coverage access component signal as compared to a different type of signal, such as a GPS signal, makes the radio signal less vulnerable to interference. In one embodiment, Precision Timing Protocol, which uses the IEEE-1588v2 protocol is used to transfer the frequency reference signal from the timing gateway to the collocated small-coverage access components. However, in alternative embodiments, other protocols may be used, and other types of outputs may be generated, including 10 MHz, 1 pps square-wave, DS1, E1, and other clock references.

In a first aspect of the present invention, a method is provided for generating frequency reference signals from a received radio signal. The method includes receiving a radio signal from a large-coverage access component, providing the radio signal to a signal processor that converts the radio signal into an intermediate reference signal, providing the intermediate reference signal to an oscillator, and filtering jitter and other abnormalities from the radio signal to generate a frequency reference signal. The method further includes encapsulating the frequency reference signal into packets that are useable by one or more small-coverage access components, and delivering the packets that comprise the frequency reference signal to the one or more small-coverage access components through a physical interface.

In a second aspect of the present invention, computer-readable media having computer-executable instructions embodied thereon that, when executed, perform a method for generating frequency reference signals from a received radio signal are provided. The method includes receiving a radio signal from a base station in a wireless communications network and, at a timing gateway, processing the radio signal provided by the base station to generate an intermediate frequency reference signal. The processing includes filtering the intermediate frequency reference signal to remove jitter and other abnormalities in the intermediate frequency reference signal by passing the intermediate frequency reference signal through an oscillator to produce a frequency reference signal, encapsulating the frequency reference signal into packets that are useable by one or more small cells, and communicating the packets comprising the frequency reference signal to the one or more small cells by way of a physical interface. The one or more small cells are one or more of a picocell or a femtocell that communicate data with at least one mobile device in the wireless communications network and that are interconnected to the physical interface.

In a third aspect of the present invention, a timing gateway is provided for generating frequency reference signals from a received radio signal. The timing gateway includes a receiving component having an antenna that receives a radio signal from a large-coverage access component. The radio signal is used to generate a frequency reference signal to synchronize one or more small-coverage access components, and the large-coverage access component transmits radio signals for communicating data with mobile devices in a wireless communications network and acts as a source of accurate frequency synchronization for the one or more small-coverage access components. The timing gateway further includes a signal processor that generates an intermediate frequency reference signal from the radio signal, and an oscillator that generates the frequency reference signal by filtering jitter and other abnormalities in the intermediate frequency reference signal. Additionally, the timing gateway includes a master component that encapsulates the frequency reference signal generated by the oscillator into packets. The packets are distributed to the one or more small-coverage access components by way of a physical interface. Further, the one or more small-coverage access components are collocated and receive the packets containing the frequency reference signal by way of the physical interface.

Initially referring to FIG. 1, an exemplary illustration 100 is provided of a timing gateway implemented in accordance with an embodiment of the present invention. While the individual components of the timing gateway are not illustrated in FIG. 1, FIG. 1 provides a high-level overview of the process described herein. Initially, a large-coverage access component 102 is illustrated. As used herein, a large-coverage access component 102 refers to a piece of equipment that facilitates wireless communication between user equipment, such as a mobile device, and what some skilled artisans refer to as a wireless communications network. In one embodiment, the large-coverage access component 102 is a macro cell, and more particularly, is a macro cell capable of outputting a Long Term Evolution-Frequency Division Duplex (LTE-FDD) signal. An LTE-FDD signal refers to a signal sent by a macro cell that is associated with a wireless communication network that utilizes LTE technology, and that operates using the FDD mode of operation. The transmitted LTE-FDD signal is organized into subframes of one millisecond (ms) duration, and ten subframes constitute a radio frame. There are two carrier frequencies, one for uplink transmission and one for downlink transmission. During each frame, there are consequently ten uplink subframes and ten downlink subframes, and uplink and downlink transmission can occur simultaneously within a cell.

The network with which the large-coverage access component 102 operates may include GSM, CDMA, WAN, WiFi, WiMAX, LTE, LTE Advanced, EVDO, HRPD, eHRPD, and the like. These technologies are listed for exemplary purposes only, and are not meant to limit the scope of the present invention. A wireless communications network may comprise one or more of the components illustrated in FIG. 1, but in one embodiment, the wireless communications network includes a cell tower, a BTS, an RNC, gateways, etc. Not all components that make up a wireless communications network are shown. Also, not all connections or possible connections are shown. In one embodiment, the large-coverage access component 102 is a base station, such as a base transceiver station (BTS). The large-coverage access component 102 may include a BTS and a cell tower for example. Further, the large-coverage access component 102 may be any other device that facilitates large coverage communication between mobile devices and the network. For example, if the wireless communications network utilizes LTE technology, the large-coverage access component 102 may be termed eNodeB. As used herein, large coverage refers to the ability of an access component to serve mobile devices in a large area, which, in some embodiments, would not include small WiFi routers, small hotspot devices, picocells, femtocells, and the like. Large-coverage access components 102 are typically able to transmit radio signals with a high strength to a large area or even to a large quantity of user devices. In embodiments, the large-coverage access component 102 provides coverage to a larger geographical area than small-coverage access components 110 and 112, which will be discussed in more detail herein. For example, the typical range of a large-coverage access component 102, such as a standard base station (e.g., macro cell), may be in the range of 5 to 10 miles, depending on frequency band, whereas the range of a small-coverage access component is typically much less.

The large-coverage access component 102, in embodiments described herein, is able to transmit a radio signal 104 that is received by a receiving component within the timing gateway 106. For example, a building with a particularly dense population of individuals having mobile devices may benefit from the use of one or more small cells, such as small cells 110 and 112. In this example, an optimally placed antenna could receive the radio signal 104 from a neighboring base station, such as the large-coverage access component 102. In embodiments, the timing gateway 106 generates a frequency reference signal 108 from the radio signal 104. The frequency reference signal 108 provides for synchronization of the small-coverage access components 110 and 112. Synchronization is essential in a wireless communications network, and generally refers to a technique applied to ensure that all access components in a wireless communications network are operating within performance parameters defined by the appropriate standard, such as 3GPP or the like. Synchronization is achieved by delivering a specifically formatted clock signal to an access component's radio. Lack of synchronization is destabilizing to a wireless communications network and may result in dropped calls or in incorrect data being transmitted to a mobile device. For many reasons, including the need to deliver higher bandwidth and alleviate the burdens on large-coverage access components, small-coverage access components, such as picocells and femtocells, are more frequently being used to supplement existing access components in a network. However, these small-coverage access components require a different approach to providing synchronization to these sites than to large-coverage access components.

Returning to FIG. 1, the particular functioning of the timing gateway 106 will be described with more specificity herein, but generally, the timing gateway 106 is responsible for generating a frequency reference signal that can be delivered to small-coverage access components that are collocated, such as in the same or neighboring building structure. In one embodiment, the timing gateway 106 includes a receiving component, a signal processor, an oscillator, and a master component. The timing gateway 106 communicates the frequency reference signal in a packet through a physical interface, such as an Ethernet physical interface.

As mentioned, the small-coverage access components 110 and 112 may be any type of access component that provides radio signals to a mobile device, therefore facilitating communication between the mobile device and the wireless communications network. The small-coverage access components 110 and 112 cover a smaller geographical area than the large-coverage access component 102. In one embodiment, the small-coverage access components 110 and 112 are one or more of a femtocell or a picocell. A femtocell is a small, low-powered cellular base station that serves a smaller coverage area than a large-coverage access component 102, such as a standard base station used in conjunction with a cell tower. Sometimes categorized as a small cell, a femtocell connects to the service provider's network via broadband, such as DSL or cable via a local router. A femtocell allows a service provider to extend service coverage indoors, for example, or at the cell edge, especially where access would otherwise be limited or unavailable. Femtocells are base stations that typically handle voice communications in a network.

A picocell is a small cellular base station that also covers a small geographical area, such as in-building or on aircraft. In wireless communications network, picocells, like femtocells, are typically used to extend coverage to indoor areas where outdoor signals do not reach well, or to add network capacity in areas with very dense phone usage, such as train stations. Picocells are base stations that typically handle data communications in a network.

When certain types of base stations, such as small-coverage access components (e.g., femtocell or picocell), are deployed in a building, it is difficult to provide a GPS signal to these small-coverage access components. For example, femtocells usually need a GPS input to maintain frequency and phase synchronization. In many cases, a clear line of sight for GPS may be difficult if not impossible. Femtocells and picocells may be deployed together or deployed separately in a network. As mentioned, femtocells are base stations that handle voice communications in a network. Picocells are base stations that handle data communications in the network.

When femtocells are deployed within a building using the GPS signal as a synchronization source, it may be costly if GPS distribution is needed. This problem becomes acute especially with the deployment of a particular type of femtocell called an eFemto or enterprise femtocell because multiple femtocells are required on various floors. eFemtos or enterprise femtocells can be found deployed in businesses or nonresidential buildings. However, femtocells can be deployed in either a residence or commercial environment. The majority of femtocells will be deployed in an enterprise area. Because of the deficiencies described above with respect to the use of a GPS signal for synchronization of small-coverage access components, methods described herein may be used to overcome these deficiencies. For example, receiving a radio signal 104 from a large-coverage access component 102 provides a high-strength signal as compared to a GPS signal, and makes the radio signal 104 less vulnerable to interference.

Figure 2:
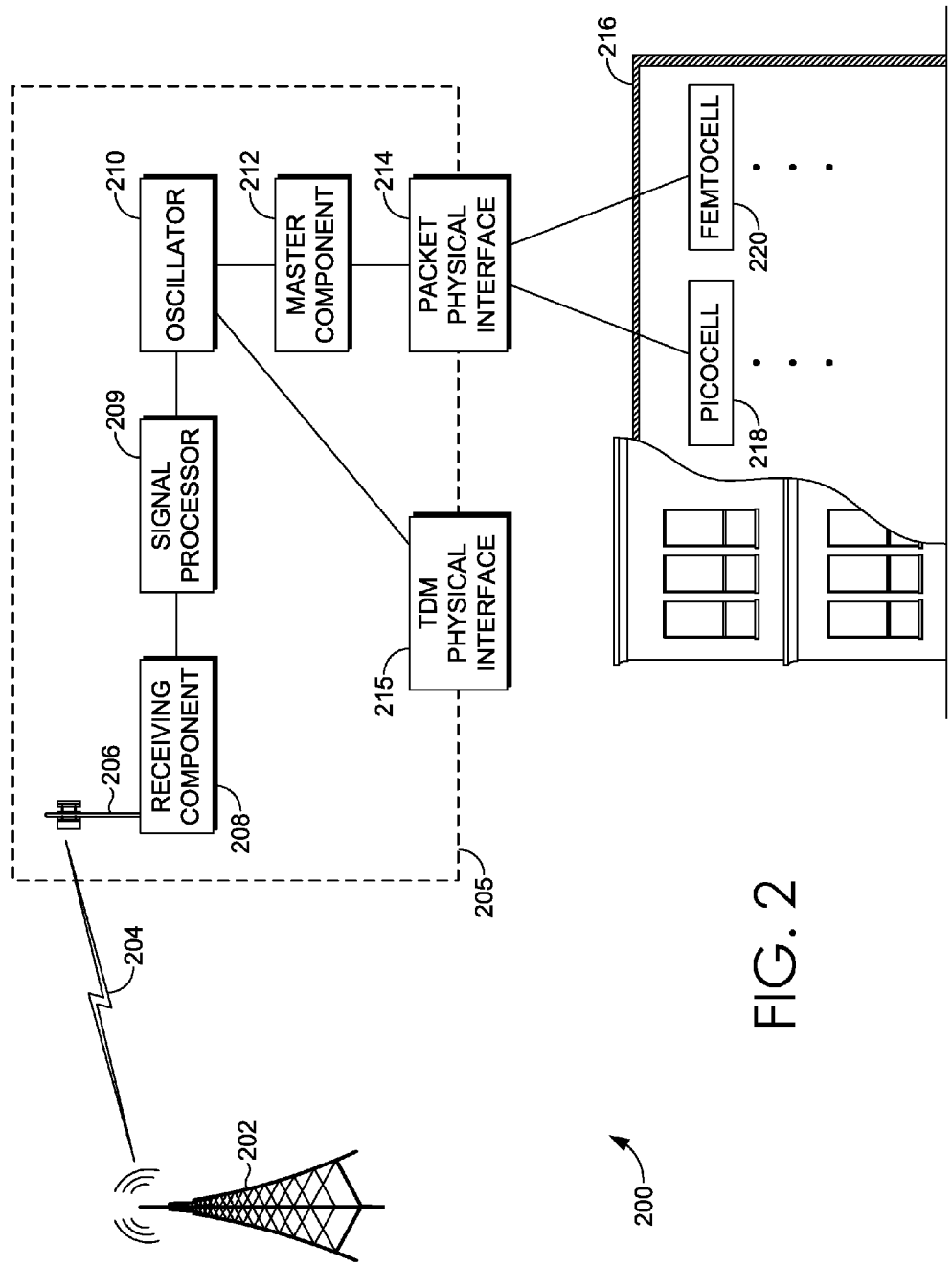
FIG. 2 depicts an exemplary operating system for carrying out embodiments of the present invention.

Turning now to FIG. 2, an exemplary operating system is depicted for carrying out embodiments of the present invention. FIG. 2 depicts an illustrative operating environment, referenced generally by the numeral 200, and illustrates an exemplary networking environment that enables the generation of a frequency reference signal from a radio signal from a large-coverage access component 202, without use of a GPS signal. The illustrative operating environment 200 shown in FIG. 2 is merely an example of one suitable operating environment and is not intended to suggest any limitation as to the scope of use or functionality of embodiments of the present invention. Neither should the operating environment 200 be interpreted as having any dependency or requirement related to any single module/component or combination of modules/components illustrated therein.

A large-coverage access component 202 transmits a radio signal 204 to a timing gateway 205. As mentioned, the large-coverage access component 202 may be any type of device that is capable of transmitting a radio signal. In one embodiment, the large-coverage access component 202 is a standard base station that has a large coverage area, as opposed to a small cell (e.g., picocell, femtocell) that has a small coverage area. In an LTE network, the large-coverage access component 202 may be an eNodeB. Instead of using a GPS as the source of frequency synchronization, the large-coverage access component 202 is the source of the radio signal 204, which is used to generate the frequency reference signal by the timing gateway 205.

The timing gateway 205 includes a receiving component 208, a signal processor 209, an oscillator 210, and a master component 212. The receiving component 208 may include an antenna 206 for receiving the radio signal 204 transmitted by the large-coverage access component 202. The signal is then sent to the signal processor 209. Generally, the signal processor 209 is responsible for processing the received radio signal and converting it to an intermediate frequency reference signal. The ouput of the signal processor 209 (e.g., intermediate frequency reference signal) provides the input to oscillator 210. Oscillator 210 provides stability to the frequency reference in the timing gateway 205. An exemplary oscillator implemented in the present invention is a crystal oscillator. However, with other implementations, other oscillators may also be employed depending on the stability or hold-over required. Such oscillators could include a rubidium oscillator, cesium oscillator, or hydrogen maser oscillator. The output of the oscillator 210 is a highly accurate reference signal. In one embodiment, the oscillator 210 filters the intermediate frequency reference signal from the signal processor 209, provides stability, etc. This reference signal is transmitted to the master component 212, which is responsible for encapsulating the frequency reference signal into packets for transmission to the small-coverage access components. In one embodiment, the master component 212 creates Precision Timing Protocol (PTP) frames. The packets are transmitted to small-coverage access components through a packet physical interface 214. In one embodiment, the packet physical interface 214 is a wired interface, and utilizes an Ethernet connection to send the packets to the small-coverage access components. In other embodiments, the TDM physical interface provides TDM frequency reference signals such as DS1, E1, 1 pps squarewave and 10 MHz.

In one embodiment, PTP, which uses the IEEE-1588v2 protocol, is used to transfer the frequency reference signals from the timing gateway 205 to the small-coverage access components. PTP is a protocol that is used to synchronize clocks in a network. As mentioned, PTP is implemented in accordance to IEEE 1588 protocol, or may be implemented according to another clock synchronization protocol. PTP can be transported over various physical layers. In the embodiment here, PTP is transported over Ethernet, also known as PTP over IEEE 802.3 or PTP over Ethernet. PTP can also be found in implementations such as PTP over UDP over IPv4 and PTP over UDP over IPv6. The IEEE 1588 standard describes a hierarchical master-slave architecture for clock distribution. Under this architecture, a time distribution system consists of one or more communication media (network segments), and one or more clocks.

While in one embodiment, the master component 212 outputs a PTP signal, in alternative embodiments, the master component 212 outputs signals that utilize other technologies or protocols, such as 10 MHz, 1 pps squarewave, digital signal 1 (DS1), and E1.

Returning to FIG. 2, as mentioned, the master component 212 encapsulates the frequency reference signals into packets for transfer to the small-coverage access components through the packet physical interface 214. In the embodiment of FIG. 2, the small cells, or small-coverage access components include a picocell 218 and a femtocell 220, both being housed in a building 216. As further described herein, multiple small-coverage access components may be collocated, such as in a single building or other structure to assist with a service provider's coverage and building penetration. The picocell 218 and the femtocell 220 may be interconnected to the packet physical interface 214 to receive the necessary frequency synchronization from the timing gateway 205. In one embodiment, two or more small-coverage access components are collocated in a single building or structure, or are in separate structures that are close in proximity.

As mentioned, in embodiments, PTP may not be utilized, and thus the frequency reference signals may not be delivered to the small cells in a packet through the packet physical interface 214. Instead, the frequency reference signals may be communicated to the small cells by way of a TDM physical interface 215. Time Division Multiplexing (TDM) is a method of transmitting and receiving independent signals over a common signal path by means of synchronized switches at each end of the transmission line so that each signal appears on the line only a fraction of time in an alternating pattern. Signals such as 10 MHz, 1 pps squarewave, digital signal 1 (DS1), and E1 may be transmitted to the small cells by way of the TDM physical interface 215.

Figures 3, 4:
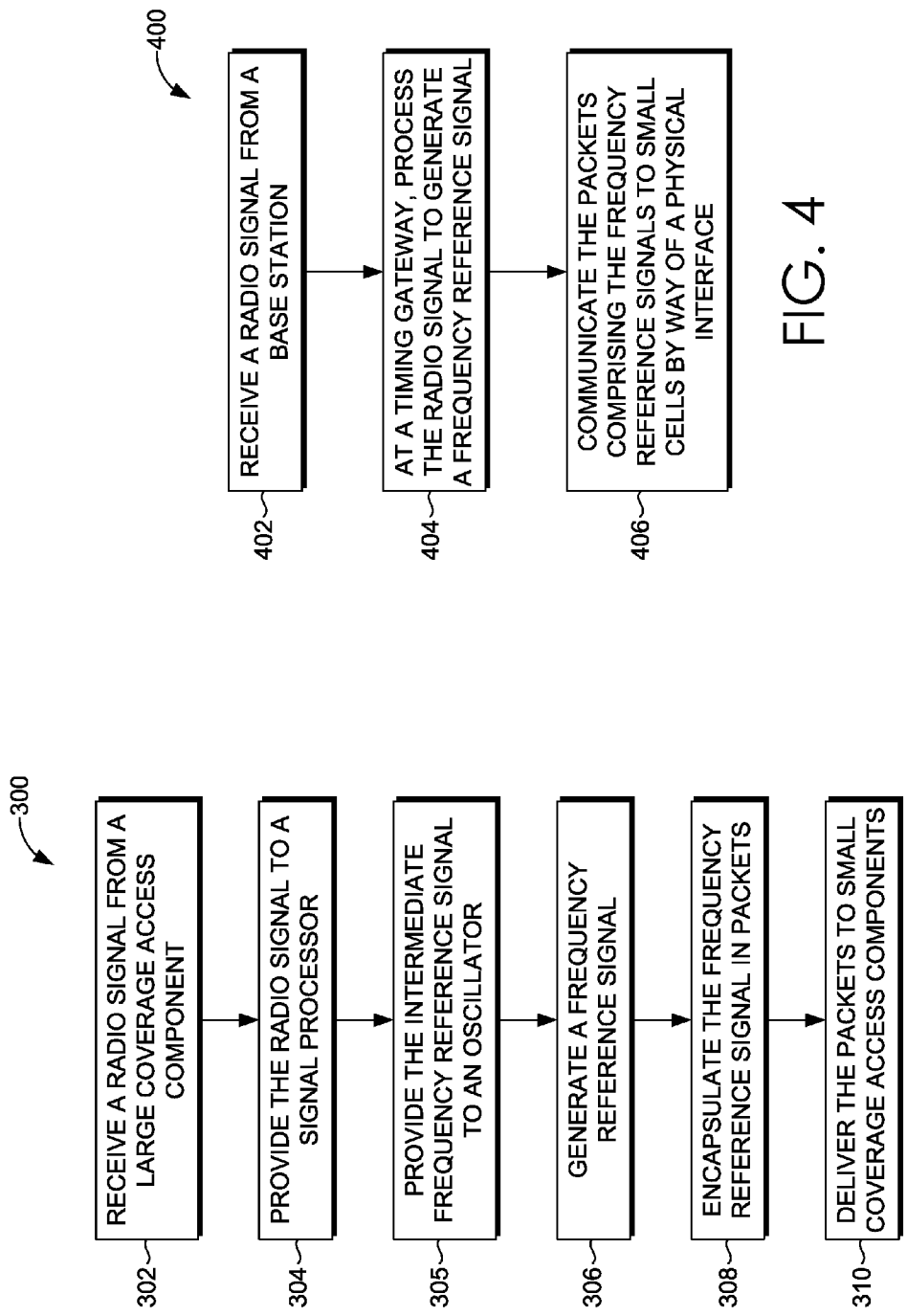
FIG. 3 depicts a flow chart of a method for generating frequency reference signals from a received radio signal, in accordance with an embodiment of the present invention.
FIG. 4 depicts a flow chart of a method for generating frequency reference signals from a received radio signal, in accordance with an embodiment of the present invention.

Turning now to FIG. 3, a flow chart is depicted of a method 300 for generating frequency reference signals from a received radio signal, in accordance with an embodiment of the present invention. At step 302, a radio signal is received from a large-coverage access component. In embodiments, the large-coverage access component whose frequency reference is traceable to GPS or some other highly accurate frequency reference source is a macro cell, such as a macro cell that is capable of outputting an LTE-FDD signal. Generally, the large-coverage access component is capable of providing coverage to a larger geographical area than a small-coverage access component, as it generally sends out stronger signals than a small-coverage access component. In one embodiment, the large-coverage access component is a base station. The base station may utilize GPS technology, but the radio signal itself originates from the base station, not the GPS. At step 304, the radio signal is provided to a signal processor for processing the radio signal to generate an intermediate frequency reference signal. At step 305, the intermediate frequency reference signal is provided to an oscillator. At step 306, the radio signal is oscillated to generate a frequency reference signal from the intermediate frequency reference signal. The oscillator filters jitter and other abnormalities from the radio signal, and provides stability for the reference signal.

At step 308, the frequency reference signal is encapsulated into packets. In one embodiment, PTP is the protocol used to transport the frequency reference signal to the small-coverage access components. As mentioned, PTP is a mechanism for transporting a value of time from a grandmaster clock in the form of a timestamp across packet networks. The syntax of the protocol is master-slave, and it has means for the slave clock to measure packet flight times on the uplink and downlink sides of the path. PTP may deliver both a phase signal in the form of one pulse per second and frequency. Other protocols that may be used in embodiments described herein to deliver the frequency reference signal include Network Time Protocol, SyncE, or a combination thereof. Once the frequency reference signal is encapsulated into packets according to the PTP or another protocol, the packets are delivered to small-coverage access components, which, in embodiments, include picocells and/or femtocells.

FIG. 4 depicts a flow chart of a method 400 for generating frequency reference signals from a received radio signal, in accordance with an embodiment of the present invention. Initially, a radio signal is received from a base station at step 402. The base station may be neighboring (e.g., close in proximity) to a grouping of collocated small cells in a common building or other structure. In embodiments, the signal is not received from a GPS, but instead from a base station, such as a base station or other macro cell that is capable of outputting an LTE-FDD radio signal. At step 404, at a timing gateway, the radio signal is processed to generate a frequency reference signal. The timing gateway, in one embodiment, includes a receiving component that receives a radio signal from a neighboring macro cell, such as a base station, a signal processor for converting the radio signal into a frequency reference signal, an oscillator for filtering out abnormalities in the radio signal, and a master component for encapsulating the frequency reference signal generated by the oscillator into packets. The packets comprising the frequency reference signals are then communicated to the small cells by way of a physical interface, shown at step 406.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for generating frequency reference signals from a received radio signal, the method comprising:
   receiving a radio signal from a large-coverage access component;
   providing the radio signal to a signal processor that converts the radio signal into an intermediate reference signal;
   providing the intermediate reference signal to an oscillator;
   filtering jitter and other abnormalities from the radio signal to generate a frequency reference signal;
   encapsulating the frequency reference signal into packets that are useable by one or more small-coverage access components; and
   delivering the packets that comprise the frequency reference signal to the one or more small-coverage access components through a physical interface.

2. The method of claim 1, wherein the physical interface is an Ethernet physical interface.

3. The method of claim 1, wherein the large-coverage access component is not a Global Positioning System (GPS).

4. The method of claim 1, wherein the large-coverage access component is associated with a communications network that utilizes Long Term Evolution (LTE) technology.

5. The method of claim 4, wherein the large-coverage access component is capable of outputting an LTE-Frequency Division Duplex (FDD) signal.

6. The method of claim 1, wherein the large-coverage access component is a base station.

7. The method of claim 1, wherein the large-coverage access component is an eNodeB component in an LTE network.

8. The method of claim 1, wherein the frequency reference signals are encapsulated into the packets utilizing the Precision Timing Protocol (PTP).

9. The method of claim 1, wherein the one or more small-coverage access components are collocated in a single building or structure.

10. The method of claim 1, wherein the one or more small-coverage access components are one or more of a femtocell or a picocell.

11. The method of claim 1, wherein the physical interface utilizes an Ethernet connection to each of the one or more small-coverage access components.

12. Non-transitory computer-readable media having computer-executable instructions embodied thereon that, when executed, perform a method for generating frequency reference signals from a received radio signal, the method comprising:
   receiving a radio signal from a base station in a wireless communications network;
   at a timing gateway, processing the radio signal provided by the base station to generate an intermediate frequency reference signal, the processing comprising,
      (1) filtering the intermediate frequency reference signal to remove jitter and other abnormalities in the intermediate frequency reference signal by passing the intermediate frequency reference signal through an oscillator to produce a frequency reference signal,
      (2) encapsulating the frequency reference signal into packets that are useable by one or more small cells;
   communicating the packets comprising the frequency reference signal to the one or more small cells by way of a physical interface, wherein the one or more small cells are one or more of a picocell or a femtocell that communicate data with at least one mobile device in the wireless communications network and that are interconnected to the physical interface.

13. The media of claim 12, wherein the radio signal is an LTE-FDD signal.

14. The media of claim 13, wherein the timing gateway comprises a receiving component having an antenna for receiving the LTE-FDD signal, a single processor, the oscillator, and a master component for encapsulating the frequency reference signal into the packets.

15. The media of claim 14, wherein the packets are communicated to the one or more small cells by way of the Precision Timing Protocol.

16. The media of claim 12, wherein the one or more small cells are collocated in a single building or structure.

17. A timing gateway for generating frequency reference signals from a received radio signal, the timing gateway comprising:
   a receiving component having an antenna that receives a radio signal from a large-coverage access component, the radio signal used to generate a frequency reference signal to synchronize one or more small-coverage access components, the large-coverage access component transmitting radio signals for communicating data with mobile devices in a wireless communications network and acting as a source of accurate frequency synchronization for the one or more small-coverage access components;

a signal processor that generates an intermediate frequency reference signal from the received ratio signal;

an oscillator that generates the frequency reference signal by filtering jitter and other abnormalities in the intermediate frequency reference signal; and a master component that encapsulates the frequency reference signal generated by the oscillator into packets, wherein the packets are distributed to the one or more small-coverage access components by way of a physical interface, wherein the one or more small-coverage access components are collocated and receive the packets containing the frequency reference signal by way of the physical interface.

18. The timing gateway of claim 17, wherein the large-coverage access component is not a Global Positioning System (GPS).

19. The timing gateway of claim 17, wherein the large-coverage access component is a base station that is associated with a communications network that utilizes Long Term Evolution (LTE) technology.

20. The timing gateway of claim 17, wherein the large-coverage access component is capable of outputting an LTE-Frequency Division Duplex (FDD) signal.

\* \* \* \* \*